US011707090B2

(12) United States Patent
Crowe (10) Patent No.: US 11,707,090 B2
(45) Date of Patent: Jul. 25, 2023

(54) PERMEABLE ELEMENT BASED VAPORIZATION PROCESS AND DEVICE

(71) Applicant: Vuber Technologies, LLC, Seattle, WA (US)

(72) Inventor: David Crowe, Lake Forest Park, WA (US)

(*) Notice: Subject to any disclaimer, the term of this patent is extended or adjusted under 35 U.S.C. 154(b) by 345 days.

(21) Appl. No.: 16/878,639

(22) Filed: May 20, 2020

(65) Prior Publication Data

US 2020/0281272 A1 Sep. 10, 2020

Related U.S. Application Data

(63) Continuation-in-part of application No. 15/860,641, filed on Jan. 2, 2018, now Pat. No. 10,701,977.
(Continued)

(51) Int. Cl.
*A24F 40/44* (2020.01)
*A24F 40/48* (2020.01)
*A24F 40/46* (2020.01)
*A24F 40/485* (2020.01)
*C03B 19/06* (2006.01)
*H05B 3/00* (2006.01)

(52) U.S. Cl.
CPC .............. *A24F 40/44* (2020.01); *A24F 40/46* (2020.01); *A24F 40/485* (2020.01); *C03B 19/06* (2013.01); *C03B 19/066* (2013.01); *H05B 3/0014* (2013.01); *H05B 2203/002* (2013.01)

(58) Field of Classification Search
CPC .......... A24F 40/42; A24F 40/44; A24F 40/46; A24F 40/485; C03B 19/06; C03B 19/066; H05B 2203/002; H05B 2203/021; H05B 2203/022; H05B 3/0014; H05B 3/04; H05B 3/44
See application file for complete search history.

(56) References Cited

U.S. PATENT DOCUMENTS

5,954,979 A * 9/1999 Counts .................. A24F 40/485
131/194
8,678,012 B2 * 3/2014 Li ............................ A24F 40/46
131/273
(Continued)

*Primary Examiner* — Abdullah A Riyami
*Assistant Examiner* — Thang H Nguyen
(74) *Attorney, Agent, or Firm* — Walker Griffin Weitzel; Alloy Patent Law (57) ABSTRACT

The present invention discloses an atomizer. The atomizer includes a concentrate reservoir volume that is in fluid communication with a concentrate vaporization assembly. The concentrate vaporization assembly includes a frit adapted to absorb concentrate from the concentrate reservoir volume. The concentrate vaporization assembly further includes a heating element adapted to heat the frit and absorbed concentrate. The atomizer further includes a vapor collection and discharge assembly including a vapor accumulation chamber in fluid communication with the frit and a vapor evacuation channel in fluid communication with the vapor accumulation chamber and in fluid communication with an egress port. The heating element is activated by a user control of a switch on a battery, which causes the concentrate contained within the frit filter to vaporize, and the user inhales resulting vapor by inhaling at the egress port of the vapor evacuation channel.

20 Claims, 6 Drawing Sheets

Related U.S. Application Data

(60) Provisional application No. 62/593,141, filed on Nov. 30, 2017, provisional application No. 62/543,316, filed on Aug. 9, 2017.

(56) References Cited

U.S. PATENT DOCUMENTS

| | | | | |
|---|---|---|---|---|
| 8,973,585 | B2* | 3/2015 | Goldstein | A24F 9/00 |
| | | | | 131/331 |
| 9,885,702 | B1* | 2/2018 | Farmen | G01N 33/58 |
| 2009/0260645 | A1* | 10/2009 | Brotton | A24D 3/16 |
| | | | | 131/365 |
| 2011/0094524 | A1* | 4/2011 | Glover | A24F 1/32 |
| | | | | 131/224 |
| 2011/0226236 | A1* | 9/2011 | Buchberger | A24F 40/00 |
| | | | | 128/200.23 |
| 2013/0034739 | A1* | 2/2013 | Boday | B32B 9/04 |
| | | | | 252/62.51 R |
| 2014/0238424 | A1* | 8/2014 | Macko | A24F 40/44 |
| | | | | 131/328 |
| 2016/0073695 | A1* | 3/2016 | Sears | H05B 3/46 |
| | | | | 131/329 |
| 2017/0197046 | A1* | 7/2017 | Buchberger | A61M 15/0086 |
| 2017/0224018 | A1* | 8/2017 | Li | A24F 40/46 |
| 2017/0303587 | A1* | 10/2017 | Johnson | A24F 40/46 |
| 2017/0354186 | A1* | 12/2017 | Johnson | A61M 11/042 |

* cited by examiner

PERMEABLE ELEMENT BASED VAPORIZATION PROCESS AND DEVICE

CROSS-REFERENCE TO RELATED APPLICATIONS

The present application is a Continuation-in-Part of U.S. patent application Ser. No. 15/860,641 filed Jan. 2, 2018 entitled "Permeable Element Based Vaporization Process and Device," which claims the benefit of U.S. Provisional Application 62/543,316 filed Aug. 9, 2017 entitled "Vaporization Device and Process," and U.S. Provisional Application 62/593,141 filed Nov. 30, 2017 also entitled "Vaporization Device and Process,", which are both incorporated herein by reference in their entirety as if fully set forth herein.

FIELD OF THE DISCLOSURE

The overall field of invention is devices and methods for vaporization of liquids and solids.

BACKGROUND

*Cannabis* and tobacco have long been used recreationally and medicinally, with smoking being the traditional and prevalent means for consumption of both. A variety of other means for consumption currently exist, while new consumption means are continually being developed.

Vaporization has gained prevalence as a means for consumption. Vaporization differs from smoking in that the *cannabis* or tobacco, extracts thereof, or synthesized nicotine or cannabinoid concentrates are merely heated to the point of vaporization, rather than combusted. Vaporization ideally produces an inhalable vapor without producing smoke. Vaporization is a highly controllable process, wherein the amount of heating applied to either the plant or concentrate can be controlled precisely, and the size of the resulting dose of medicament is much more predictable than the size of a dose taken through smoking. Vaporization differs from smoking in that the raw plant or concentrate is heated to a temperature high enough to volatilize the medicament into vapor but low enough to avoid combustion. Combustion products and byproducts, such as smoke and $NO_x$, may be undesirable for consumption for a variety of reasons, including health effects and flavor preference. Vaporization optimally produces no smoke and the vapor will exhibit a complete absence of any associated burnt flavor.

Vaporizers adapted for use with concentrate typically rely on an ohmic resistive heating element that is either proximal to or in direct contact with the concentrate to be vaporized. Although the temperature and heat output of the heating element is controllable to some degree and is generally calibrated for a desired vapor production, the design inherently produces uneven heating of concentrate. This uneven heating creates some degree of micro localized concentrate burning with resulting smoke and associated burnt flavor. The presence of a burnt flavor can be exacerbated through improper vaporizer operation. Because smoke and burnt flavors are dominant and difficult to mask, even very small degrees of localized burning can produce a persistent burnt flavor.

A need exists for a vaporizer that is substantially resistant to producing smoke or any accompanying burnt flavor.

SUMMARY

The object of the present invention is to provide an improved concentrate vaporization method that is resistant to localized concentrate burning and an associated vaporizer device adapted for performing said method.

The present invention is a method for vaporizing concentrate that will substantially eliminate general or localized burning of concentrate during the vaporization process and a device adapted for carrying out said method. The vaporization method is based on heating concentrate that has been absorbed into a frit, preferably a fritted glass. Fritted glass is characterized by open-pore interstices that allow free passage of fluid through the frit. It is commonly used as a filtering element, particularly in high-temperature applications. It was discovered that concentrate placed in contact with fritted glass is absorbed through capillary action. Although room temperature concentrate may not readily seep fully into fritted glass, as concentrate is heated its viscosity is reduced such that it is readily absorbed by the fritted glass. While glass frits are preferred, other non-porous, heat resistance materials, such as stainless steel, may be substituted for glass. Intrinsically porous materials, such as ceramic are undesirable in this application, as it introduces uncontrolled pore sizes and geometries, which result in microscopic localized burning.

Frits have unusual thermal properties stemming from a combination of extremely high surface area relative to volume, permeability, porosity, high internal thermal resistivity due to relatively low conductive area between the individual sintered components that together comprise the frit. Frits differ from other porous solid filters in that they are formed by sintering process in which a plurality of discrete particles is fused through application of heat and pressure. Unexpectedly, when a frit has absorbed concentrate, the frit may be directly exposed to heat sources, including flame or radiant heat, and concentrate contained within the frit will be heated sufficiently to vaporize, but insufficiently to cause any substantial localized burning. Additionally, frits are themselves filters, and micron filter frits, when used in this application, provide the particulate filtration that further improves the quality of produced vapor over traditional vaporization methods.

The invented method of vaporization is therefore to cause a frit to absorb concentrate, to heat said frit and contained concentrate sufficiently to produce vapor while producing extremely limited localized burning to the extent that any associated burnt flavor would be essentially undetectable by the human palate, and to evacuate said vapor.

The invented device is a vaporizer specially adapted to carry out the invented method.

DEFINITIONS

Vapor: Gaseous or suspended liquid condensate suitable for inhalation.

Vaporize: to produce vapor from a liquid or solid.

Vaporizer: Device used to vaporize.

Sinter: To fuse constituent solid components into a single solid component through application of heat and pressure.

Glass: any solid comprised mostly of vitreous silica.

Quartz glass: glass comprised of chemically pure vitreous silica.

Frit: Permeable vaporization element such as sintered glass or filter of any intrinsically non-porous and heat resistant composition (for example, stainless steel) that is substituted where a frit of glass may otherwise have been used.

Concentrate: Formulation of extracted active ingredients from *Cannabis* or Tobacco, including cannabinoids such as THC or CBD, alkaloids such as nicotine, or other medicinal or psychoactive compounds, or synthetic versions thereof. Generically, this includes cannabinoid extracts such as oil, wax, budder, shatter, and similar products, as well as nicotine products such as e-juice and similar products.

DETAILED DESCRIPTION

In the Summary above, Detailed Description, claims below, and accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100, and includes both 25 and 100. Further, in the context of the present disclosure, the terms "frit", "frit filter", etc are interchangeably used but should be considered to indentify the similar items. Likewise, the terms such as "heat source", "heating element", etc are interchangeably used to and should be considered to identify similar items.

Figure 1:
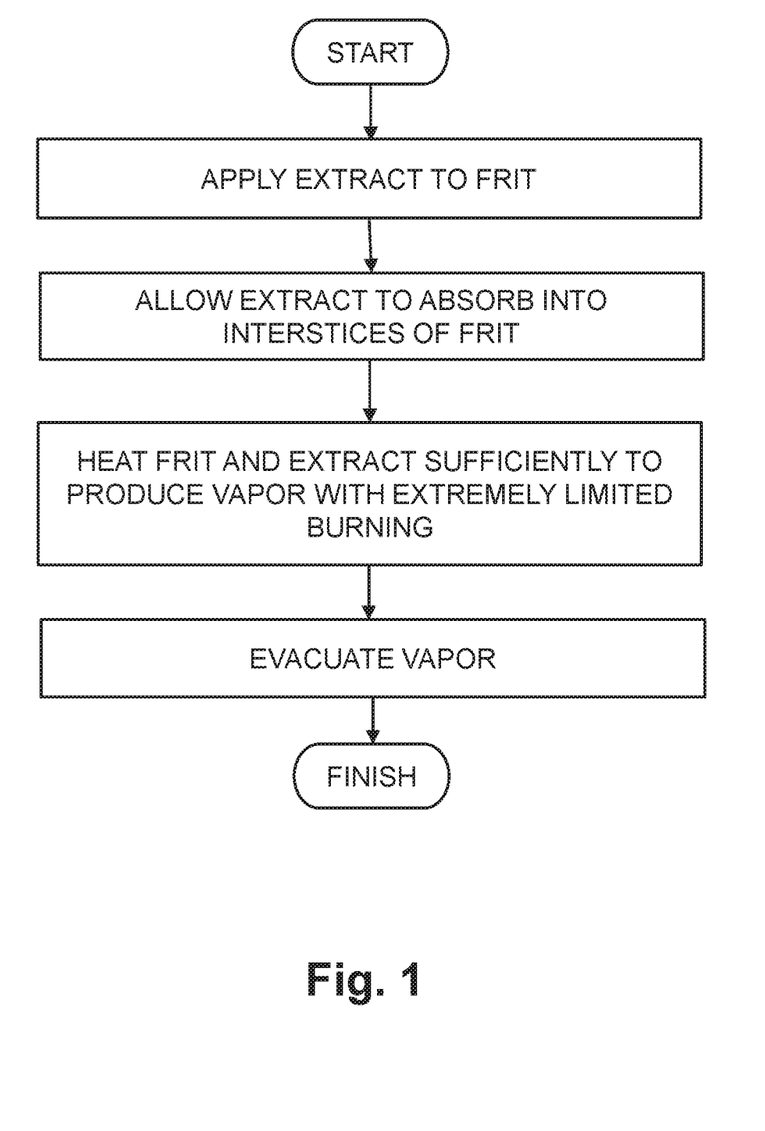
FIG. 1 shows a flow diagram of the method, according to an embodiment of the present invention.

FIG. 1 shows a flow diagram of the invented method, comprised of four steps.

Step 1: Apply concentrate to a frit. In the preferred method, said frit is a fritted glass.

Step 2: Allow concentrate to absorb into interstices of said frit, preferably through application of heat to said concentrate and frit. In the preferred method, heat is applied via radiant heating from a proximal ohmic resistive heating element. In alternative methods, other heat sources may be used including flame or high-temperature air or other gas.

Step 3: Continue heat application to induce vaporization of said concentrate to produce a vapor.

Step 4: Evacuate said vapor.

Figure 2:
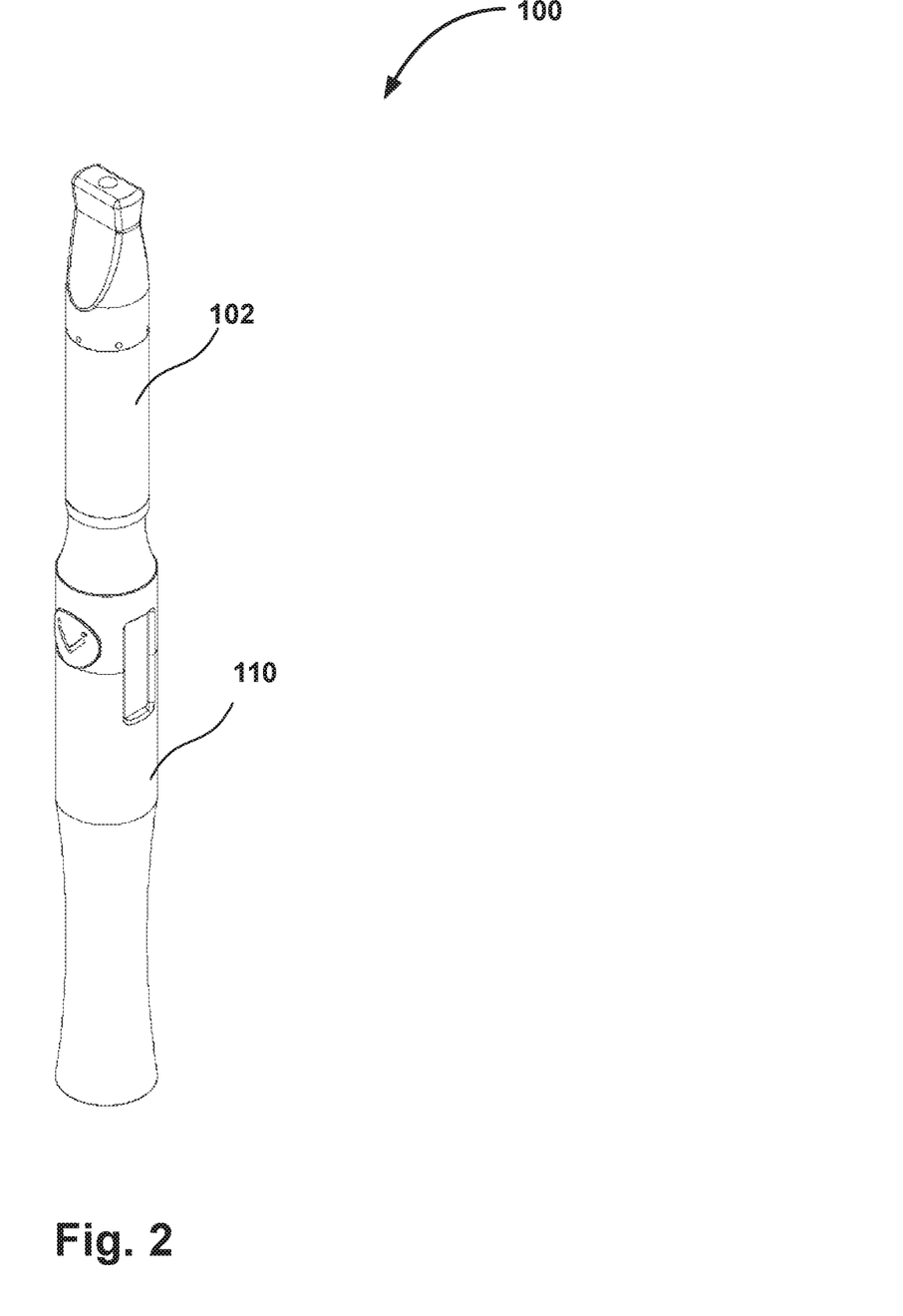
FIG. 2 shows an isometric view of the vaporizer, according to an embodiment of the present invention.

FIG. 2 is an isometric view of the vaporizer, which is adapted for performing the invented method. The vaporizer 100 is comprised of an atomizer 102 that engages to a battery 110 adapted to supply electrical current to the atomizer 102.

Figure 3:
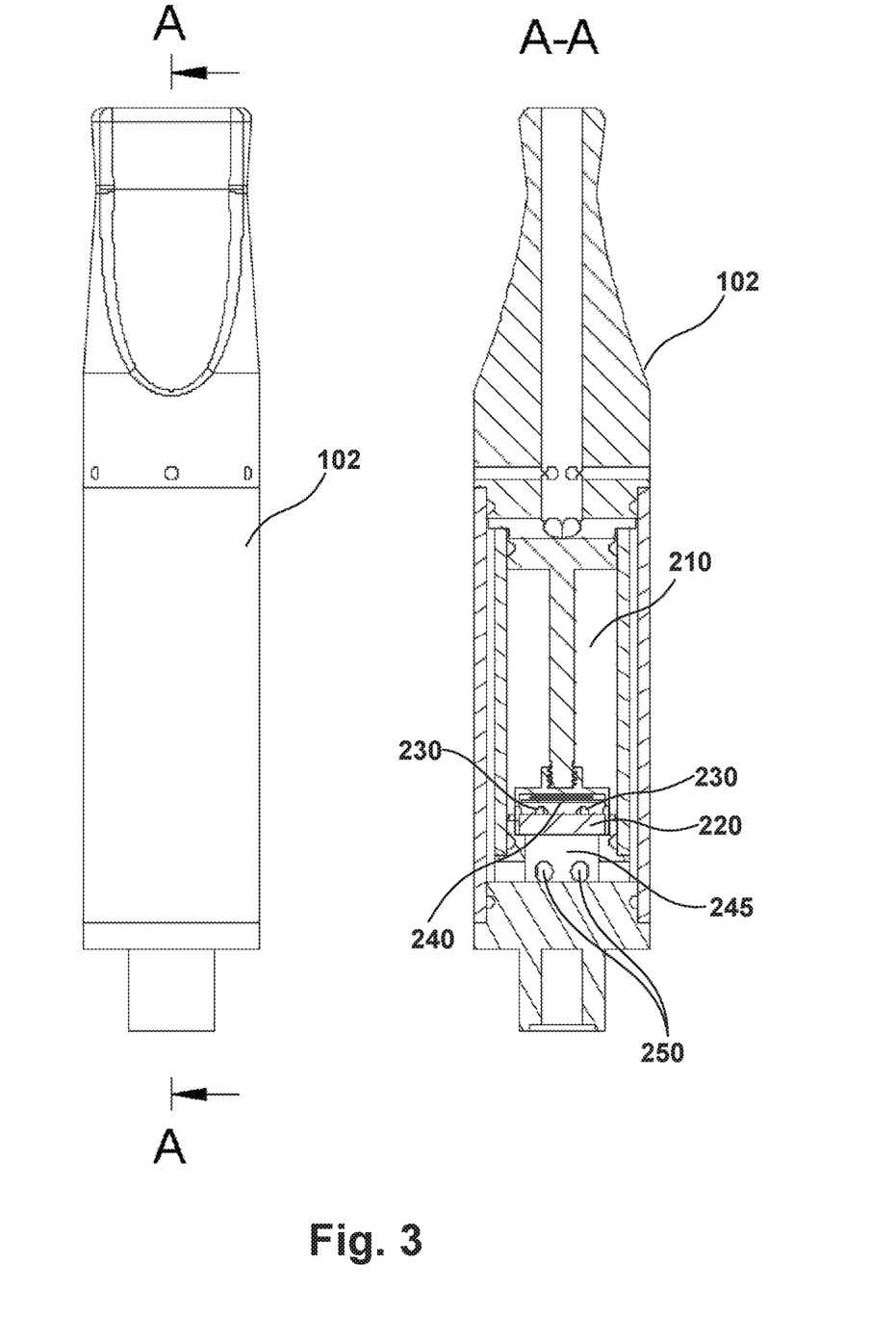
FIG. 3 shows front and section views of the atomizer, according to an embodiment of the present invention.

FIG. 3 is a front view and section view of the atomizer 102. The atomizer is comprised of a concentrate reservoir volume 210 capable of containing some volume of concentrate, a concentrate vaporization assembly consisting of a frit filter 220 and a heat source or heating element 240 configured proximal to the frit 220, a supply port 230 through which concentrate may flow from the reservoir volume 210 to the frit 220, and a vapor collection and discharge assembly consisting of a vapor accumulation chamber 245 and a vapor evacuation channel 250.

Figure 4:
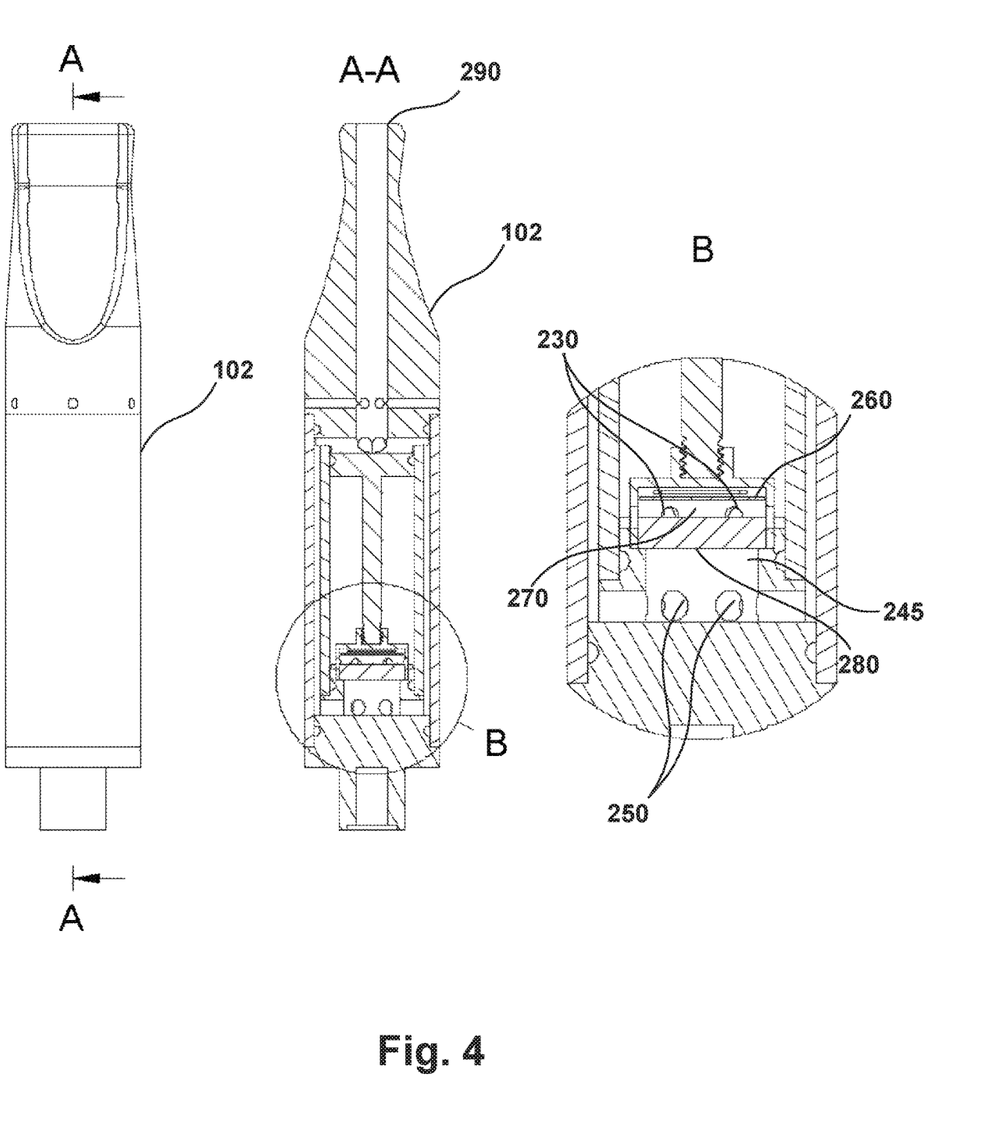
FIG. 4 shows front and section views of the atomizer and a detail view of the frit and proximal components, according to an embodiment of the present invention.

FIG. 4 shows front and section views of the atomizer and a detail view of the frit 220 and proximal components. In the preferred embodiment, the supply ports 230 are positioned such that concentrate freely flows to a concentrate preheating chamber 270. In the preferred embodiment, the preheating chamber 270 is a cylindrical reservoir volume formed by the frit 220 on its lower face, and the heating element 240 at its upper face. When the heat source 240 is operated, concentrate contained within the preheating chamber 270 will increase in temperature with a resulting reduction in viscosity. The reduced viscosity allows the concentrate to be readily absorbed into the interstices of the frit 220.

Figure 5:
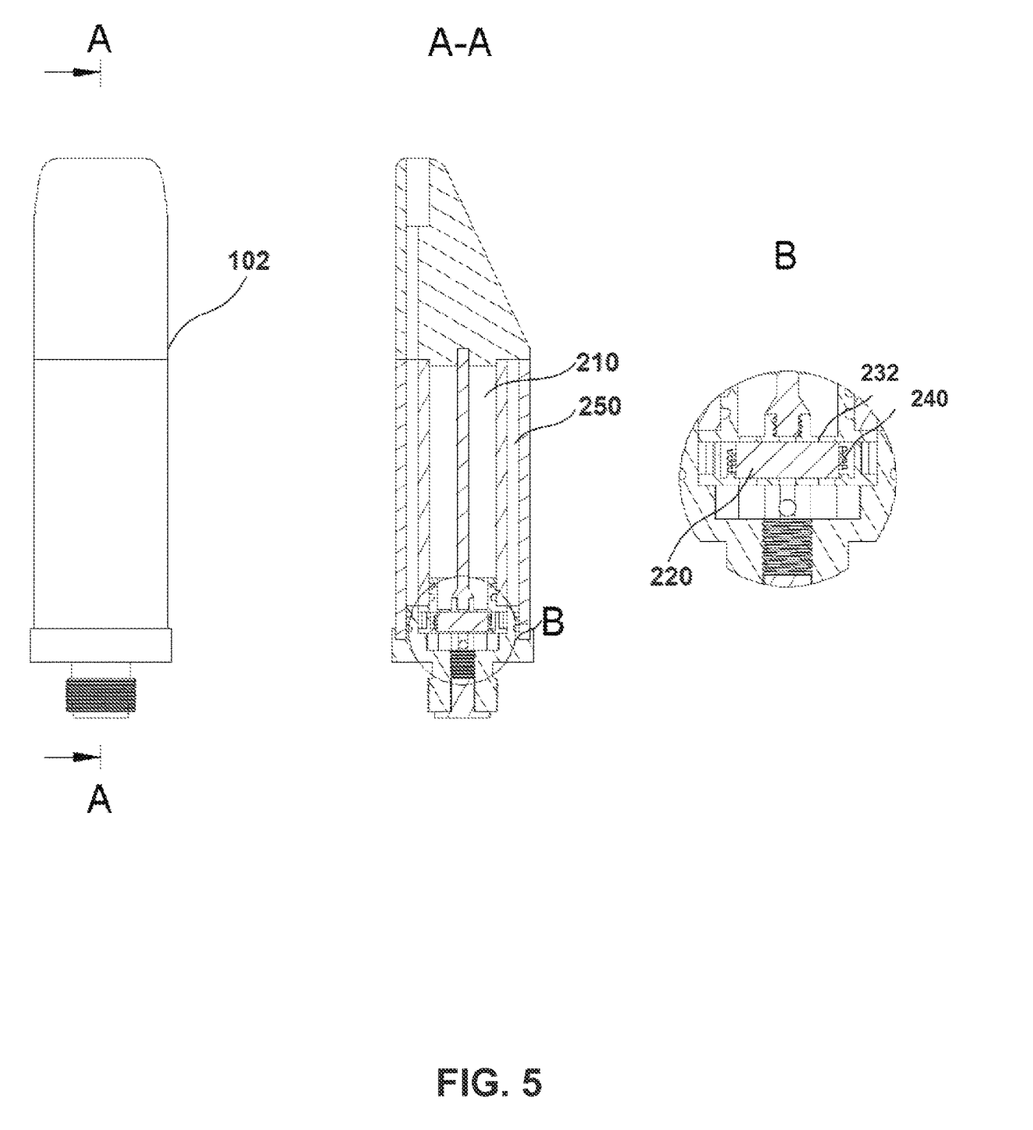
FIG. 5 shows front and section views of an alternative embodiment of the atomizer and a detail view of the frit and proximal components.

FIG. 5 shows an alternative embodiment of the atomizer. In this embodiment, the heating element 240 is a helical resistive element that is positioned proximally and coaxially with the frit 220. In the embodiment, the supply port 232 is in direct fluid communication with the frit 220. As concentrate is vaporized, it vaporized concentrate accumulates at the vapor accumulation chamber 245 (volume below the frit's lower surface 280) and evacuated through the evacuation channel 250, concentrate will flow from the reservoir volume 210 into the frit 220 until the frit 220 is resaturated with concentrate.

Figure 6:
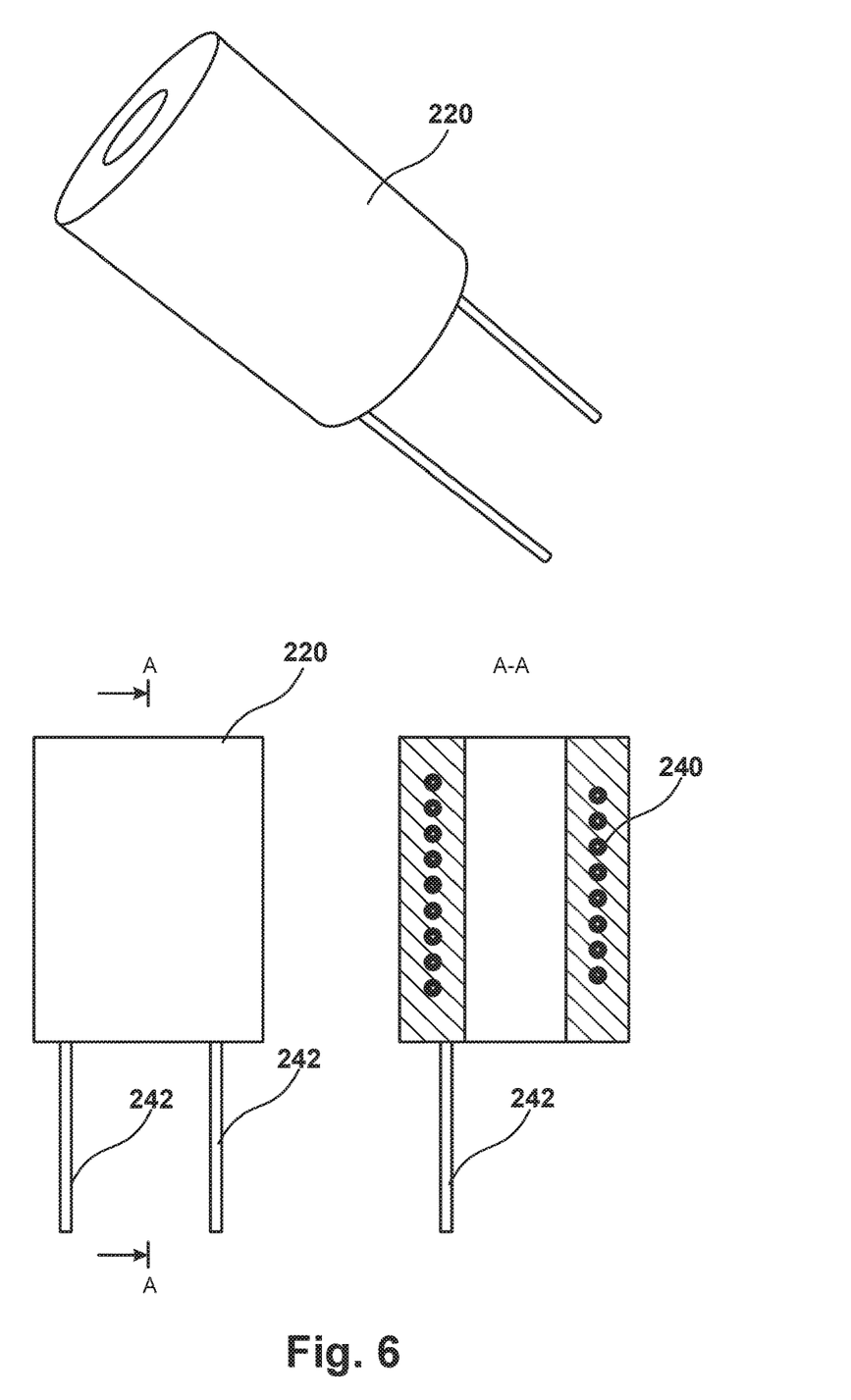
FIG. 6 shows perspective, front and section views of an alternative embodiment of the frit having an embedded heating element.

In the preferred embodiment, the heating source 240 is an ohmic heating element, which produces heat when electrical current is supplied by the battery 110. In the preferred embodiment, the heating element 240 is a coil, captured by a glass plate 260. In alternative embodiments, the heating element 240 may be potted, freely exposed within the preheating chamber 270, embedded within the preheating chamber 270 walls, embedded within the frit 220, or otherwise positioned proximal to or in contact with the frit 220 such that heat output from the heating element 240 is transferred to the frit 220. In an embodiment, the frit 220 is in the form of a hollow cylinder (as shown in FIG. 6) or other prismatic toroid. Fritted glass bodies are less susceptible to microscopic and macroscopic damage when a minimum feature radius is observed. In an embodiment, the fritted glass has a minimum feature radius of 1 mm. In alternative embodiments, the heat source 240 may be a flame or other heat source. The heating element 240 in the preferred embodiment is operable by a user through user control of the electrical current. In the preferred embodiment, the attached battery 110 will control current to the heat source 240, typically through a switch, in order to supply electrical current to the heating element 240. The heating element 240 will produce heat, which is transferred to the frit 220 and any absorbed concentrate. The heated concentrate will vaporize. Vaporized concentrate will freely flow through the frit 220 and exit through the frit's lower surface 280 and accumulate into the vapor accumulation chamber 245 and then get evacuated through the the evacuation channel 250 which is in fluid communication with the vapor accumulation chamber 245. The resulting vapor may be evacuated from the device 100 through the evacuation channel 250 by means of application of a pressure differential, said pressure differential typically produced by a user inhaling through the evacuation channel 250 at the egress port 290.

As concentrate contained within the frit 220 is vaporized, gravity and capillary action will cause concentrate to flow from the concentrate reservoir 210 through the supply port 232 to resaturate the frit 220. Resaturation is aided by preheating concentrate contained in the preheating chamber 270. Resaturation of the frit 220 is further aided by the arrangement of the heating element 240, the preheating chamber 270, and the frit 220.

FIG. 6 shows a perspective, front and section views of an alternative embodiment of the frit having an embedded heating element. In the embodiment, the frit 220 is generally cylindrical in shape and is hollow inside. The heating element 240 has leads 242 that, when connected to the cathode and anode of a battery (such as the battery 110) form an electrical circuit. The heating element 240 is embedded within the volume of the frit 220.

Preferred Method of Use

In the preferred method of use, the concentrate is of sufficiently low viscosity that it will readily flow toward gravity. The heating element 240 is activated by user control of a switch on the battery 110, which will cause concentrate contained within the frit 220 to vaporize, and the user will inhale resulting vapor by inhaling at the egress port 290 of the evacuation channel 250.

While preferred and alternate embodiments have been illustrated and described, as noted above, many changes can be made without departing from the spirit and scope of the present disclosure. Accordingly, the scope is not limited by the disclosure of these preferred and alternate embodiments. Instead, the scope of the present disclosure is to be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶916.

What is claimed is:

1. An atomizer (102) comprising:
   a concentrate reservoir volume (210) configured for holding concentrate, wherein said concentrate reservoir volume (210) is in fluid communication with a concentrate vaporization assembly, said concentrate vaporization assembly comprising:
      a frit filter (220) adapted to absorb concentrate from said concentrate reservoir volume (210), and
      a heating element (240) proximal to said frit filter (220), and adapted to heat said frit filter (220) and absorbed concentrate; and
   a vapor collection and discharge assembly comprising:
      a vapor accumulation chamber (245) in fluid communication with said frit filter (220), and
      a vapor evacuation channel (250) in fluid communication with said vapor accumulation chamber and in fluid communication with an egress port (290), and
   a supply port (230),
      wherein said supply port (230) is in direct fluid communication with said frit filter (220) positioned such as to allow free flow of said concentrate from said concentrate reservoir volume (210) into a concentrate preheating chamber (270), and wherein said concentrate preheating chamber (270) is a cylindrical reservoir volume formed by said frit filter (220) on its lower face, and said heating element (240) at its upper face.

2. The atomizer (102) of claim 1, wherein said frit filter (220) is sintered glass.

3. The atomizer (102) of claim 2, wherein said frit filter (220) is sintered quartz glass.

4. The atomizer (102) of claim 1, wherein said heating element (240) is embedded within said frit filter (220).

5. The atomizer (102) of claim 4, wherein said frit filter (220) is in a shape of a hollow cylinder.

6. The atomizer (102) of claim 5, wherein said frit filter (220) has a minimum feature radius of 1 mm.

7. The atomizer (102) of claim 1, wherein said concentrate preheating chamber (270) is in proximal to said frit filter (220) for receiving said concentrate from said concentrate reservoir volume (210).

8. The atomizer (102) of claim 1, wherein said heating element (240) is helical in shape and positioned proximally and coaxially with said frit filter (220).

9. The atomizer (102) of claim 1, wherein said heating element (240) is configured as a coil, captured by a glass plate (260).

10. The atomizer (102) of claim 1, wherein said heating element (240) is potted and freely exposed or embedded within said concentrate preheating chamber (270) such that heat output from said heating element (240) is transferred to said frit filter (220).

11. A vaporizer (100) comprising:
   an atomizer (102);

a battery (110) adapted to supply electrical current to said atomizer (100);

wherein, said atomizer (100) comprising
- a concentrate reservoir volume (210) configured for holding concentrate, wherein said concentrate reservoir volume (210) is in fluid communication with a concentrate vaporization assembly, said concentrate vaporization assembly comprising:
  - a frit filter (220) adapted to absorb concentrate from said concentrate reservoir volume (210), and
  - a heating element (240) proximal to said frit filter (220), and adapted to heat said frit filter (220) and absorbed concentrate; and
- a vapor collection and discharge assembly comprising:
  - a vapor accumulation chamber (245) in fluid communication with said frit filter, and
  - a vapor evacuation channel (250) in fluid communication with said vapor accumulation chamber and in fluid communication with an egress port (290), wherein said heating element (240) is activated by a user control of a switch on said battery (110), which causes said concentrate contained within said frit filter (220) to vaporize, and said user inhales resulting vapor by inhaling at said egress port (290) of said vapor evacuation channel (250), and
- a supply port (230),
  - wherein said supply port (230) is in direct fluid communication with said frit filter (220) positioned such as to allow free flow of said concentrate from said concentrate reservoir volume (210) into a concentrate preheating chamber (270), and wherein said concentrate preheating chamber (270) is a cylindrical reservoir volume formed by said frit filter (220) on its lower face, and said heating element (240) at its upper face.

12. The vaporizer (100) of claim 11, wherein said frit filter (220) is sintered glass.

13. The vaporizer (100)) of claim 11, wherein said frit filter (220) is sintered quartz glass.

14. The vaporizer (100) of claim 11, wherein said heating element (240) is embedded within said frit filter (220).

15. The vaporizer (100) of claim 14, wherein said frit filter (220) is in a shape of a hollow cylinder.

16. The vaporizer (100) of claim 15, wherein said frit filter (220) has a minimum feature radius of 1 mm.

17. The vaporizer (100) of claim 11, wherein said concentrate preheating chamber (270) is in proximal to said frit filter (220) for receiving said concentrate from said concentrate reservoir volume (210).

18. The vaporizer (100) of claim 11, wherein said heating element (240) is at least helical in shape and positioned proximally and coaxially with said frit filter (220), a coil, captured by a glass plate (260), or
   potted and freely exposed or embedded within said concentrate preheating chamber (270) such that heat output from said heating element (240) is transferred to said frit filter (220).

19. An atomizer comprising:
- a concentrate reservoir volume (210) configured for holding concentrate, wherein said concentrate reservoir volume (210) is in fluid communication with a concentrate vaporization assembly, said concentrate vaporization assembly comprising:
  - a frit filter (220) adapted to absorb concentrate from said concentrate reservoir volume (210), and
  - a heating element (240) proximal to said frit filter (220), and adapted to heat said frit filter (220) and absorbed concentrate; and
- a vapor collection and discharge assembly comprising:
  - a vapor evacuation channel (250) in fluid communication with an egress port (290), wherein said heating element (240) is activated by a user control of a switch on said battery (110), which causes said concentrate contained within said frit filter (220) to vaporize, and said user inhales resulting vapor by inhaling at said egress port (290) of said vapor evacuation channel (250), and
- a supply port (230),
  - wherein said supply port (230) is in direct fluid communication with said frit filter (220) positioned such as to allow free flow of said concentrate from said concentrate reservoir volume (210) into a concentrate preheating chamber (270), and wherein said concentrate preheating chamber (270) is a cylindrical reservoir volume formed by said frit filter (220) on its lower face, and said heating element (240) at its upper face.

20. The vaporization process of claim 19, wherein said frit filter (220) absorption of said concentrate through capillary action is induced by reduction of concentrate viscosity through application of heat to said concentrate.

* * * * *